United States Patent [19]
Gieling et al.

[11] Patent Number: 5,144,780
[45] Date of Patent: Sep. 8, 1992

[54] PORTABLE STRUCTURE

[76] Inventors: Thomas G. Gieling, 2341 Rainbow Valley blvd., Fallbrook, Calif. 92028; David Behoteguy, 1395 Hazlewood, Brea, Calif. 92621; Ralph Dillon, 417 Via Del Monte, Oceanside, Calif. 92054

[21] Appl. No.: 674,596

[22] Filed: Mar. 25, 1991

[51] Int. Cl.$^5$ ............................................ E02D 27/42
[52] U.S. Cl. ...................................... 52/298; 52/726; 135/106; 135/114; 135/909; 403/292; 403/295
[58] Field of Search .................. 135/87, 105, 106, 114, 135/909; 403/292, 295, 297, 298; 52/726

[56] References Cited

U.S. PATENT DOCUMENTS

| | | | |
|---|---|---|---|
| 2,702,926 | 3/1955 | Rahaim | 403/298 |
| 3,232,160 | 2/1966 | Fork et al. | 403/298 X |
| 3,759,623 | 9/1973 | Heese | 403/298 |
| 3,904,197 | 9/1975 | Canonge | 403/292 X |
| 3,946,916 | 3/1976 | Lawrence | 403/292 X |
| 4,200,906 | 4/1980 | Santilli | 52/289 X |
| 4,573,424 | 3/1986 | Clausin | 403/298 X |
| 4,657,426 | 4/1987 | Targetti | 403/297 |
| 4,895,548 | 1/1990 | Holland et al. | 52/726 X |
| 4,896,992 | 1/1990 | Muhlethaler | 403/295 X |
| 4,962,805 | 10/1990 | Allen | 403/295 X |

FOREIGN PATENT DOCUMENTS

| | | | |
|---|---|---|---|
| 21114 | 4/1882 | Fed. Rep. of Germany | 403/292 |
| 2420569 | 10/1975 | Fed. Rep. of Germany | 403/295 |
| 1562522 | 4/1969 | France | 403/292 |

Primary Examiner—David A. Scherbel
Assistant Examiner—Lan Mai
Attorney, Agent, or Firm—John J. Murphey

[57] ABSTRACT

A plurality of members for temporary assembly into a rigid branch structure for supporting a cover to form an enclosure, including a plurality of elongated rigid, hollow posts defined by opposed pairs of flat post walls joined together along their respective marginal edges between spaced-apart terminal ends, the walls having formed therein at least one pair of apertures in spaced-apart, opposed relationship near each post terminal end and a series of elongated ribs extending inward from the walls and along the lengths of the posts between the apertures, a coupling for axially joining one post to another in rigid, axial, end-to-end alignment including a butt plate for transverse positioning between the terminal ends of the joined posts, at least two stems extending outward from the butt plate for insertion a distance into each hollow post end, each stem including two pairs of closely-spaced webs arranged in spaced-apart configuration and defined by opposed marginal edges spanning between the opposed walls of the post and having formed between the closely-spaced webs a slot for sliding receipt therein of a pair of opposed ribs when the stems are inserted into the hollow post ends, a cross-web transversely intersecting the spaced-apart pairs of webs and an end plate arranged parallel to the butt plate and intersecting the terminal edges of the webs and the cross-web to rigidify the stem and, a pair of arms of terminal length, extending downward along the stems, exterior thereof, and arranged to slidingly engage the interior surface of the post walls, the arms having formed thereon outwardly disposed tabs for securely fitting into the apertures formed in the opposed post walls after the arms are biased inward and the stems are fully inserted in the terminal ends of the posts.

20 Claims, 4 Drawing Sheets

PORTABLE STRUCTURE

BACKGROUND OF THE INVENTION

1. Field of the Invention

This invention pertains to the field of portable, rigid structures. More particularly, it pertains to a plurality of individual members that may be interconnected to form a rigid structure to support a wide selection of cover means to form a covered enclosure to enclose a variety of activities including golfing practice, T-ball batting practice, soccer practice, tennis practice, and even extending to events that are non-sports oriented such as enclosing weaponry such as army tanks and the like for military use.

2. Description of the Prior Art

Man has constructed enclosures since he first walked on the earth. Many of these structures have been carved out of monolithic rock, built of palm leaves or branches, and dug in hill sides. These structures all have one fundamental limitation, namely that they cannot be easily disassembled and removed to a remote location for re-assembly.

Portable structures, i.e., those that may be disassembled and removed to another location for re-assembly, are more difficult to design and construct because of a number of additional requirements. For instance, the design should be quickly and easily assembled and disassembled. The individual members making up the structure should be easily packageable for convenient portability to the remote location. The individual members should be lightweight, yet strong, and resist physical loading from overlying covers and from torsional loading due to wind effects and other environmental pressures.

The members must be interconnectable using few tools and, most desirably, using only hand labor. Further, for commercial acceptance, the members should be made of low-cost, strong and durable materials capable of withstanding a wide variety of natural effects such as rain, wind, heat or temperature, and the acidic effects of our environment. Disassembly should be easily accomplished and the parts easily and quickly stacked and crated for shipment to the new location. Finally, the individual members should be able to be arranged in a wide variety of configurations as well as being assembled into a strong, rigid enclosure that will remain fixed even when long spans are involved.

The prior art has mainly concentrated on use of thin-walled aluminum tubing or nylon rods to form the enclosure. In most cases, the overlying covering is designed to cooperate with the tubes or rods in their assembled form to provide the required strength to resist loading due to environmental effects. This requires that the structure always be assembleable into the same configuration and not change its size or shape. Aluminum also has been found to degrade in the presence of salt water, ground water and other environmental conditions so that its longevity is questionable, at best.

SUMMARY OF THE INVENTION

This invention is a unique plurality of members for temporary assembly into a rigid branch structure that may be easily disassembled, crated and moved to a new location for reassembly. The individual members are strong and made of high-strength materials, yet their overall manufacturing cost is moderate due, in part, to the use of efficient manufacturing processes to produce the uniquely designed parts. The materials making up the individual members are structurally rigid and the parts are designed to interfit in such a manner as to form a highly rigid, yet load-supporting structure that may take on a variety of configurations depending upon the whims of the assembler and the exigencies of the circumstances in which the structure is required. The elongated members, namely the posts, are made of thick-walled plastic and have internal reinforcing ribs to supply added support to the overall structure. They connect in a unique manner with individual coupling members to form a highly rigid, yet easily assembleable and disassembleable structure. The outer surface of the individual members is made smooth for safety and to be able to be overlaid with a variety of covering or other sheet material to provide the necessary amount of shelter and yet be strong enough to support a substantial load. The individual members are internally reinforced and the reinforcement is combined during assembly with other internal reinforcement to produce the added rigidity of the structure that makes this invention far and away superior to those existing in the prior art.

Accordingly, the main object of this invention is a unique and novel plurality of members available for temporary assembly into a variety of rigid branch structures for supporting cover means to form a covered enclosure or a framework on which to hang a netting-covered wall Other objects of the invention include a lightweight plurality of members that may be assembled into a rigid and strong branch structure, said members being easily stackable and crateable for delivery to a remote location for reassembly; members, including fittings, that are all interchangeable, members that contain inner reinforcement means that cooperate with various assembling members to be coordinated into a strong structure capable of withstanding wind loads and other environmental pressures; a plurality of members that are made of low-cost materials and low-cost production methods thereby being amenable for purchasing by a wide range of the buying public; an invention that can be assembled into a wide variety of sizes and shapes of structures to fit the exigencies of the circumstances; an invention that may be fastened to a supporting surface to rigidify the structure and make it more permanent or that may be allowed to rest by its own weight on the supporting surface; and a plurality of members that are tightly interfittable and/or interchangeable to resist the weight of overlying coverings.

These and other objects of the invention will become more apparent when the description of the preferred embodiment is read together with the drawings that are appended hereto. The scope of protection sought by the inventor may be gleaned from a fair reading of the claims that conclude this specification.

DESCRIPTION OF THE PREFERRED EMBODIMENT

Figure 1:
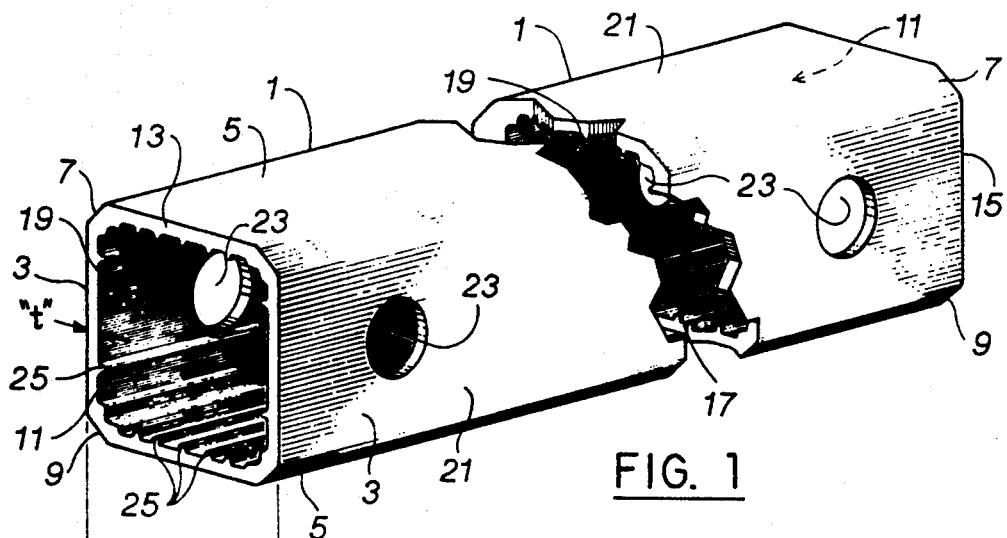
FIG. 1 is a sectioned trimetric view of one end and a portion of one of the posts that make up this invention.

Turning now to the drawings wherein like elements are identified with like numerals throughout the nine figures, FIG. 1 shows one portion of one of the plurality of rigid, hollow posts 1 of this invention. Post ! is defined by opposed pairs of post walls 3 and 5 respectively that are joined along their beveled marginal edges 7 and 9 to form a strong tubular member of various lengths such as 4 feet long, 5 feet long and terminated by hollow ends 11 that are defined by terminal edges 13 and 15. Said post has a hollow interior 17 defined by an inner surface 19 and an exterior surface 21 that is preferably smooth. The thickness "t" of walls 3 and 5 may vary but are preferred to be in the range of 1/16 inch to ⅜ inch and more preferably ⅛ inch.

It is preferable that post walls 3 and 5 are of equal width "w" so that the cross-sectional area defined by terminal edges 13 and 15 is square. The materials used in making post 1 as well as other members of this invention may be selected from a wide range of structural materials such as polycarbonate and acrylonitrile-butadiene-styrene (ABS) plastios inoludin9 fiber-filled variations thereof. These materials are especially suitable to extrusion and injection molding so as to maintain a low per-unit cost of fabrication. Presently, the polycarbonate "LEXAN" (trademark) is preferred for making the posts and most of the other components.

Said post walls have formed therein at least one pair of openings or apertures 23 set in spaced-apart, opposed relationship near each hollow post end 11. As shown in FIG. 1, one pair of apertures 23 are shown to be round or circular in overall shape and are positioned close to, i.e., preferably approximately 1 inch to 1½ inch inward from hollow end 11. Further, as shown in FIG. 1, the opposite hollow end 11 of post 1 has formed therein another pair of apertures 23 in spaced-apart, opposed relationship in the same order of depth inward from said post end 11. By spaced-apart and opposed is meant that apertures 23 are formed in both walls 3 or in walls 5 to be positioned directly across the hollow interior of post 1.

A plurality of elongated ribs 25 are formed on inner post surface 19 that rise above the surface thereof, preferably between 1/16 inch to ⅛ inch in height, and being wider at the wall surface and tapering toward the top thereof. Said ribs 25 are made of the same material making up post 1 and preferably are ⅛ inch wide at the base tapering to 1/16 inch at the top. Ribs 25 are spaced about interior post wall surface 19, preferably ½ inch to ⅝ inch apart, except for those areas wherein apertures 23 are located; no ribs are placed about the apertures, however, it is preferred to place only one rib 25 on post walls 3 on each side of aperture 23 outboard thereof. Ribs 25 extend the total length inside of post and provide further strenqth over the span thereof.

Figure 2:
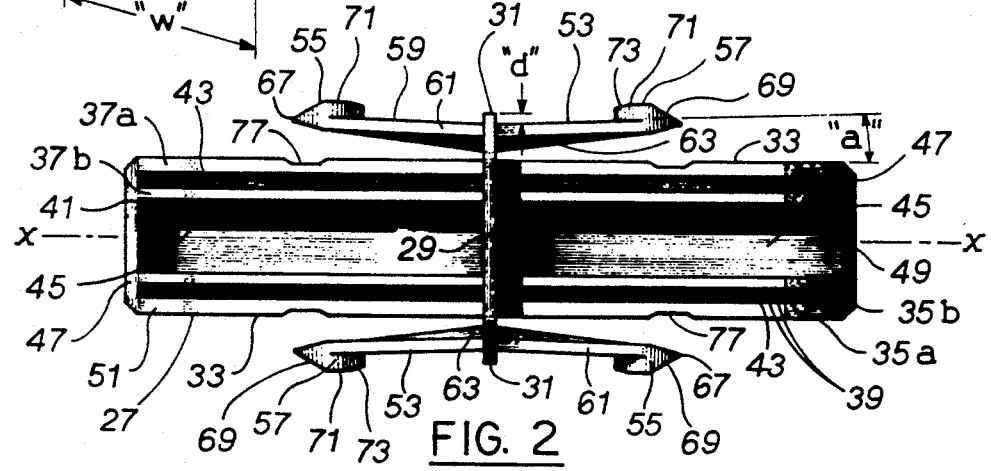
FIG. 2 is a top elevational view of a coupling of this invention used to join two posts in rigid, axial, end-to-end alignment.
Figure 3:
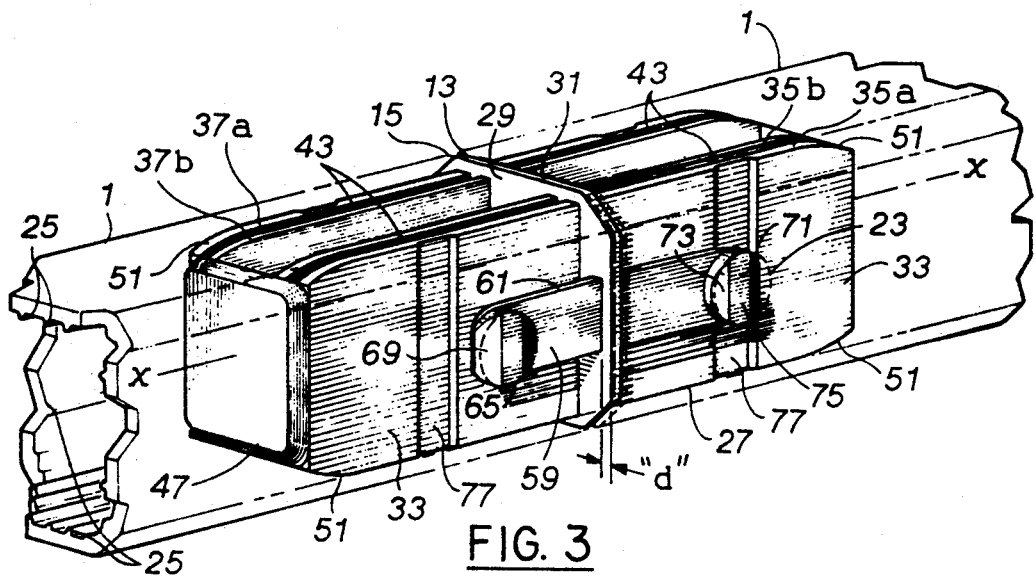
FIG. 3 is an trimetric view of the coupling of FIG. 2.

Two or more posts 1 may be joined together in rigid, axial, end-to-end alignment by the use of a coupling 27 as shown in FIGS. 2 and 3. Coupling 27 comprises a narrow butt plate 29 that is defined by outer margins 31 that extend to outer post surface 2 to provide a smooth overall contour. Butt plate 29 is transversely positioned between the hollow ends 11 of two posts for attachment in end-to-end alignment. A stem 33 extends outward from at least one side, but preferably both sides, of butt plate 29, said stems lying in axial alignment along axis x—x as shown in FIG. 3, for insertion a distance into the hollow ends of two posts beyond apertures 23, as shown in phantom in FIG. 3. Stem 33 includes two pairs of closely spaced webs 35a–35b and 37a–37b set in spaced-apart configuration that are defined by opposed marginal edges 39 and a distal edge 41.

Webs 35a–35b and 37a–37b are made wide enough to span between opposed interior post wall surfaces 19. Each pair of webs 35a–35b and 37a–37b have formed therebetween and along their marginal edges a narrow slot 43 for sliding receipt of a pair of opposed ribs 25 when coupling 27 is inserted into hollow post end 11 as shown in phantom in FIG. 3. This interconnection between ribs 25 and webs 35a–35b and 37a–37b provide additional support and strength to the joinder of the two posts and provide additional strength to resist shear and torsional loading. A central cross-web 45 extends between webs 35a and 37a from butt plate 29 to distal end 41 and central thereof to provide even more rigidity thereto.

An end plate 47 is arranged parallel to and spaced-apart from butt plate 29 and intersects distal ends 41 of webs 35a–35b and 37a–37b as well as the distal end 49 cross-web 45 to further rigidify stem 33. Webs 35a–35b and 37a–37b have formed thereon a curved portion or ramp 51 near distal edges 41, preferably at an angle of approximately 45°, to facilitate the insertion of stem 33 into hollow post end 11 and obtain alignment of ribs 25 in slots 43.

A pair of arms 53 are shown in FIGS. 2 and 3 extending outward from butt plate 29 and downward along stems 33, parallel to webs 35a and 37a and spaced-apart therefrom, and arranged to slidingly engage post inner wall surfaces 19 when stems 33 are inserted in post hollow end 11. Arms 53 are preferably centrally located between webs 35a and 37a and are generally wider than thick as shown. Arms 53 terminate at a distal end 55, preferably short of end plate 47, at which is disposed an outwardly protruding tab 57 of a size and shape to fit securely into aperture 23 when stem 33 is fully inserted into hollow post end 11. Once assembled, tabs 57 prevent unwanted withdrawal of post 1 from stem 33 and disengagement of the struoture.

Arm 53 is defined by a broad top surface 59 and a narrow side surface 61 and is formed at a slight angle to the surface of outer webs 35a and 37a as it progresses outward toward web distal end 55. This angle "a" is on the order of 1.5°. Arm 53 is supported by a central web 63 formed under and central thereof beginning at butt plate 29 and tapering toward tab 57.

The distance "d" between arm top surfaces 59 at butt plate 29 is set equal to the distance between opposed interior post wall surfaces 19. The angle of 1.5° begins at the junoture of arm 53 with butt plate 29 and increases along arm 53 toward distal end 55. The purpose for this is to provide a continuing bias of tab 57 in aperture 23 after stem 33 and arms 53 are fully inserted in hollow post end and tab 57 snaps outward into secure receipt in aperture 23.

Tab 57 is defined by a peripheral edge 65 that is preferably shaped the same as aperture 23 so that the interfit therebetween results in a secure interconnection. In one embodiment, shown in FIGS. 2 and 3, a knife edge 67 is formed adjacent arm distal end on tab 57, in the form an assembly ramp 69 that is angled out of tab upper surface 71 toward outer webs 35a and 37a. Ramp 69 and knife edge 67 permit easier introduction of tabs 57 into post hollow end 11 during insertion of coupling stems 33. To disassemble posts 1 from coupling 27, tabs 57 are pressed inward through aperture 23 and out of contact with post walls 3 and then post 1 is withdrawn from stem 33.

In another embodiment, shown in Fi9ure 2, a disassembly chamfer 73 is formed at the opposite end of knife edge 67 angled from tab upper surface 71 toward arm top surface 59 to facilitate the removal of tab 57 out of aperture 23, back into its biased downward position, during withdrawal of arm 53 from post hollow end 11. With both chamfer 69 and 73 in place, a narrow, flat band 75 remains as the upper surface of tab 57 for pressure by the fingers through aperture 23 inward when attempting to withdraw coupling 27 from post hollow end 11.

In coupling 27, shown in FIGS. 2 and 3, a narrow depression 77 is formed in outer surface of webs 35a and 37a immediately below tab distal end 55 for the purpose of allowing arm 53 and tab 57 to be biased downward to bring tab upper surface 71 and flat band 75 below inner post surfaces 19. This facilitates the introduction and insertion of arms 53 and tabs 57 into post hollow end 11.

Figure 4:
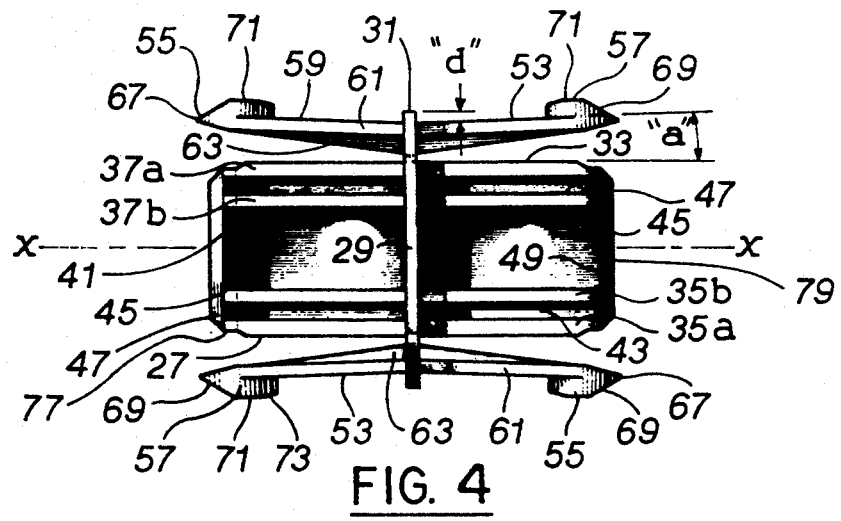
FIG. 4 is an top elevational view of another coupling useful in this invention.
Figure 5:
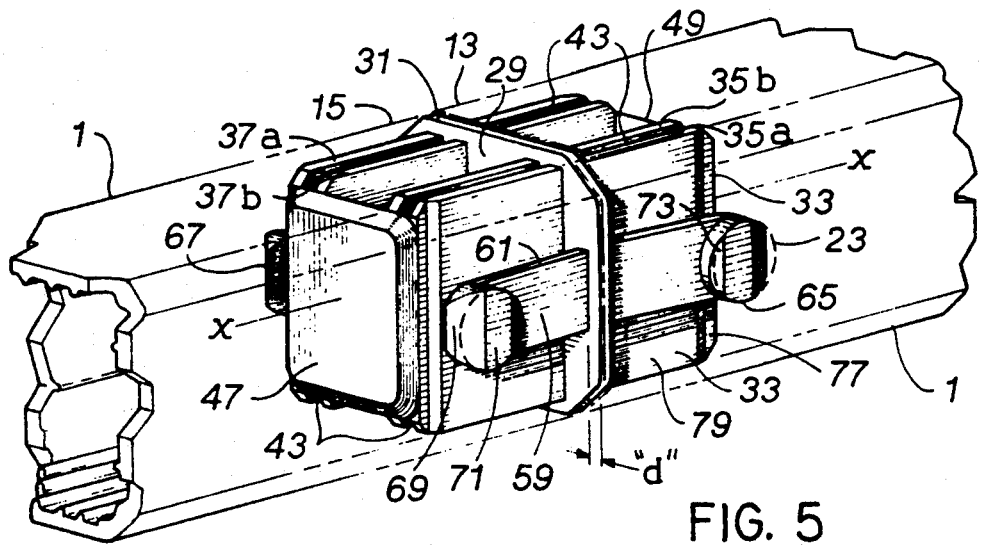
FIG. 5 is a trimetric view showing two posts (phantomed) joined in rigid, axial, end-to-end alignment with a coupling as shown in FIG. 2.

Referring to FIG. 4, a short coupling 79 is shown comprised of the same butt plate 29, stem 33, spaced-apart pairs of webs 35a-35b and 37a-37b, cross-web 45, end plate 47, arms 53 and tabs 57 as shown with respect to coupling 27. Stem or stems 33, however, in this embodiment, are shorter in length than stem 33 in coupling 27. This "short" coupling is useful wherein significant translational and torsional post loads are not anticipated. In this embodiment, the same chamfer 69 and 73, along with knife edge 67, are preferred to be formed on tab 57. Narrow depression 77 is now located at web distal end 49 as opposed to being located between butt plate 29 and web distal end 49 as shown in FIG. 2.

Figure 6:
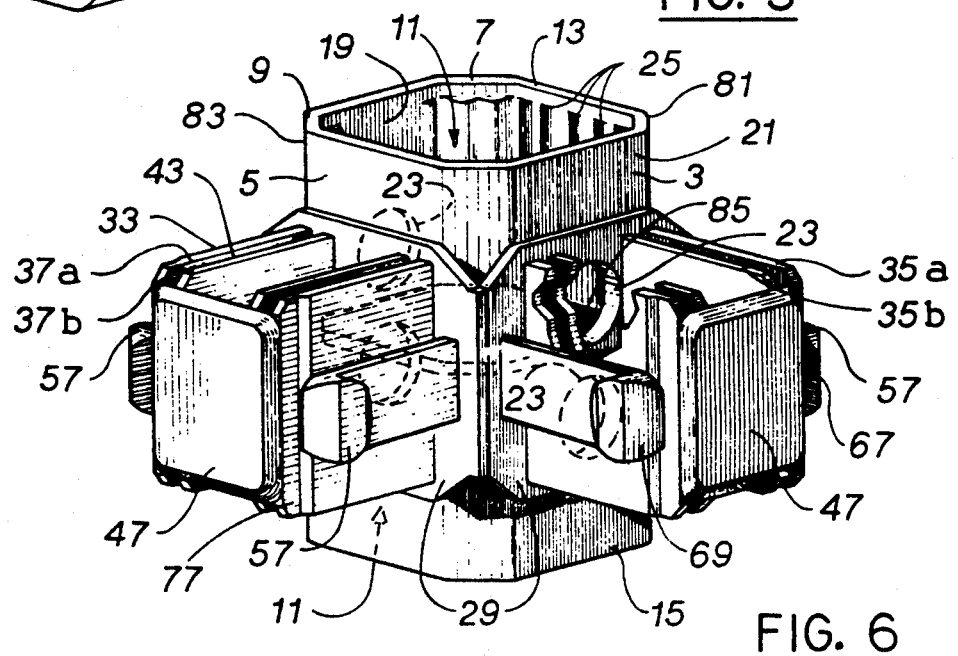
FIG. 6 is an trimetric view of a branch coupling useful for joining posts in rigid orthogonal alignment.

Referring to FIGS. 6, a branch coupling 81 is shown for axially joining one post to another in rigid, orthogonal alignment, and is shown to comprise a short length or stub 83 similar in configuration to post 1, i.e., similarly defined by opposed pairs of flat post walls 3 and 5, with smooth outer surfaces 21, joined together along their respective bevelled marginal edges 7 and 9 and terminated by edges 13 and 15 to form opposed, faced-apart hollow post (stub) ends 11. A transverse web or bulkhead 85 is formed transverse to an intermediate hollow stub end 11 to provide additional strength to stub 83. In addition, a pair of apertures 23 are formed in spaced-apart, opposed relationship near bulkheads 85. Further, a series of elongated ribs 25 are formed and extend inward from interior stub walls surfaces 19 and along the length of stub 83 between apertures 23. For orthogonal alignment and coupling of two or more posts, at least two butt plates 29 are arranged in orthogonal relationship, each mounted adjacent one of flat exterior stub surfaces 21, for transverse positioning of other posts adjacent their hollow post ends 11. A stem 33 extends outward from each butt plate 29 similar to those shown in FIGS. 2 through 5, along with arms 53. Stems 33, arms 53 and tabs 57 are similarly received after insertion in the hollow stub ends 11 for rigid connection thereto along with ribs 25 beinq slidingly received in slots 43 formed between spaced-apart webs 35a-35b and 37a-37b of each stem to provide additional support thereto.

Figure 7:
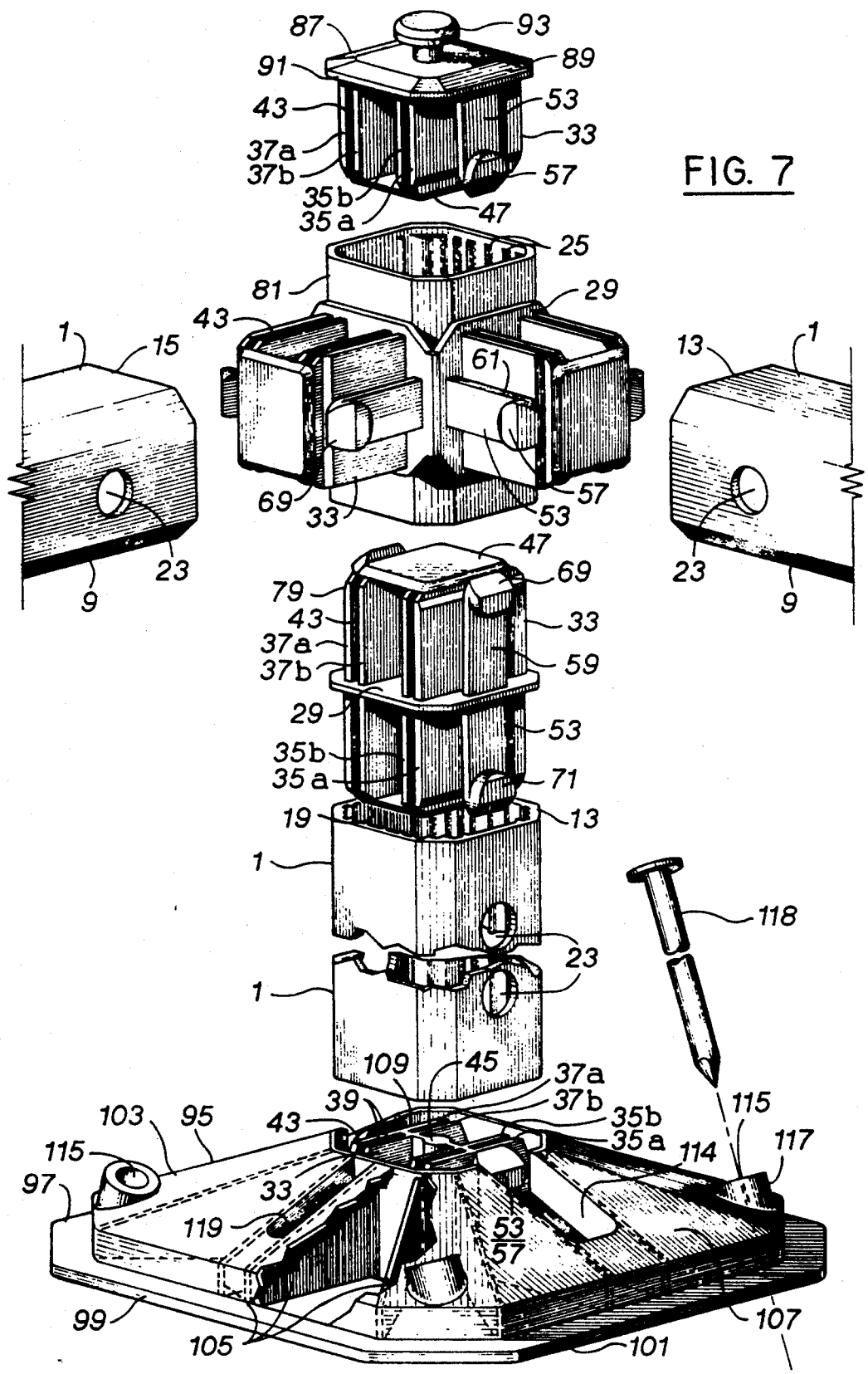
FIG. 7 is an exploded trimetric, partly fragmentary view of a variety of posts joined together by the branch coupling of FIG. 6 and further including an end cap and base plate; and, FIG. 8 is an illustrative view of a branch enclosure supporting covering means.

As is shown in FIG. 7, branch coupling 81 is used to provide coupling between horizontal posts 1 that are in orthogonal relationship to an upwardly extending post 1 that is coupled to branch coupling 81 through a short coupling 79 of the type shown in FIG. 6. While stems 33 are shown in FIGS. 6 and 7 to be at right angles to each other, they may be placed 180° apart and further, may be joined with one or two other stems 33 to form a three- or four-sided corner or branch coupling 81 and all are fully contemplated within the scope and spirit of this invention.

Referring again to FIG. 7, an end cap 87 is shown for closing off either hollow post end 11 or hollow stub end 11 of a branch coupling 8!. End cap 87 comprises an end plate 89 for transverse positioning over hollow post (or stub) end 11; said plate 89 is defined by marginal edges 91 preferably of the same size and shape as that of post exterior surface 21 to form a smooth exterior surface thereover. A stem 33 similar to those shown in short coupling 79 extends downward from one side of end plate 89 and comprises spaced-apart pairs of webs 35a-35b and 37a-37b, slots 43, cross-web 45 (not shown), and end plate 47 as previously described. Tabs 57 are arranged on arms 53 to engage apertures 23 formed near each hollow post or stub end 11. A knob 93 or other handle extends outward from end plate 89 on the opposite side from stem 33 for grasping and manipulating end cap 87. Knob 93 is preferably located centrally on end plate 89 and may take a variety of forms, all of which are fully contemplated within this invention.

Referring again to FIG. 8, a base plate 95 is provided to support posts 1 on a surface and to provide overall structural support to the enclosure made by this invention. Base plate 95 is shown to be comprised of a planar base rim 97, defined by marginal edges or perimeter 99 that form a planar perimeter 101 for resting on a support surface such as a concrete floor or the ground. A platform 103 extends inward and upward from base rim 97 to enclose perimeter 99 and is supported by a plurality of ribs 105 formed thereunder and attached to rim 97 in spoke-like arrangement. As shown, platform 103 is comprised of a series of flat surfaces 107 interconnected and angling upwardly and inwardly from base rim 97 towards the center thereof. Platform 103 has formed therein an upwardly opening depression or cup 109 central thereof that extends downward to a bottom plate 111 (not shown) is co-planar with base rim 97. A stem 33 including spaced-apart pairs of webs 35a-35b and 37a-37b, defined by opposed marginal edges 39 and having formed therein slots 43 and including cross-web 45 extends upward from bottom plate 111 for receipt thereover of post hollow end 11. Stem 33 further includes arms 53 and tabs 57, previously described, for insertion along post interior wall surfaces 19 so that tabs 57 will snap outward and securely engage apertures 23 as previously described when post 1 is fully seated in depression 109.

Preferably, platform 103 has formed therein a pair of deep, narrow depressions 114 adjacent arms 53 that extend outward therefrom towards base rim 97 and are of a depth sufficient to expose tabs 57 for the purpose of allowing one,s fingers additional room to squeeze tabs 57 inward of apertures 23 when biasing arms 53 and tabs 57 inward, out of contact with interior post walls surface 19 during disassembly of post 1 from base plate 95. It is preferred that planar base rim 97 be in the form of a square or other rectangular figure such as octagonal, and the corners thereof be bevelled or rounded as shown in FIG. 8 to reduce the danger of contact with sharp corners, etc.

Platform 103 has formed therein a plurality of downwardly extending bores 115, that preferably an acute angle to the vertical and that terminate in bosses 117 extending above platform 103 at the corners of base plate 95 for receipt therethrough of elongated fasteners such as bridge nails 118 as shown in FIG. 7 for anchoring base plate 95 on a supporting surface. A slot 119 may be formed in platform 103 for insertion of "S" hooks that are attached to cords or wires that are crossconnected between nonadjacent corners to aid in retaining the shape of the structure. Base plate 95 has been found to be more amenable to utilization when made from a strong, structural yet slightly yieldable material such as ABS resin.

Figure 8:
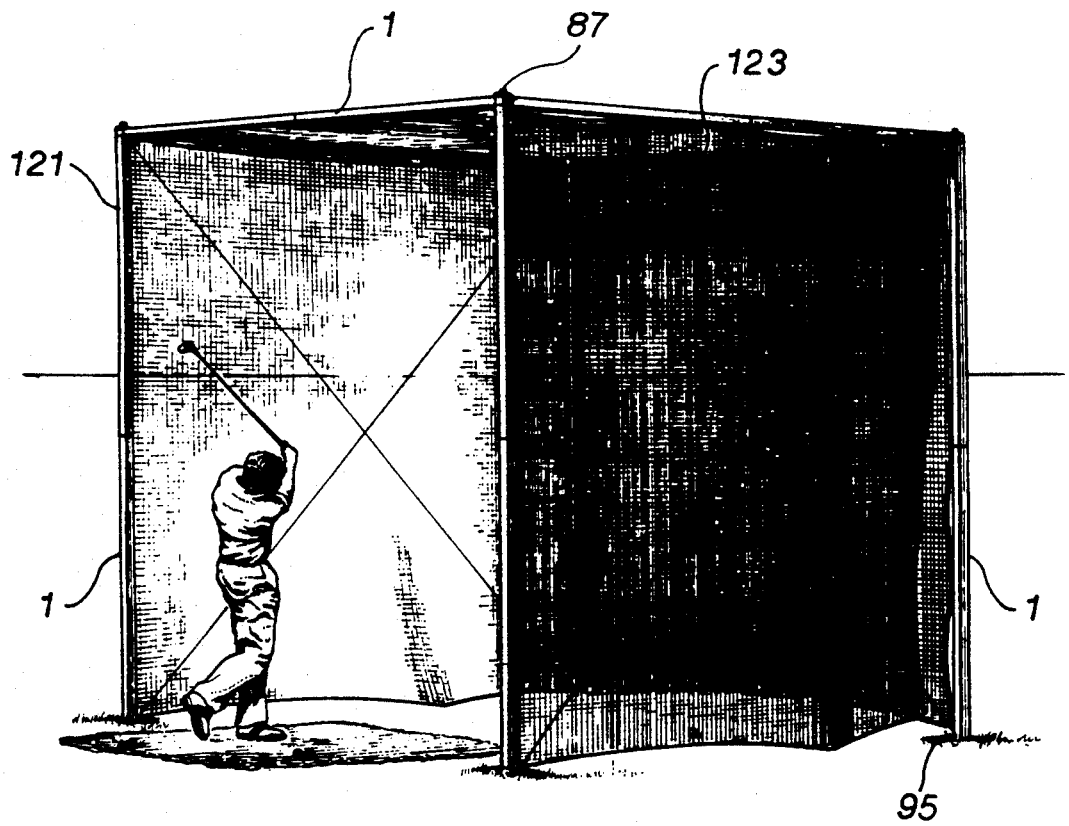

As shown in FIG. 8, a rigid branch structure 121 may be made from a plurality of assembled members from this invention for supporting web or cover means 119 that may be in the form of nylon netting, shade cloth, blankets, or camouflage covering as shown.

What is claimed is:

1. A plurality of members for temporary assembly into a rigid branch structure for supporting cover means to form an enclosure, comprising:
   (a) a plurality of elongated rigid, hollow posts defined by opposed pairs of flat post walls joined together along their respective marginal edges between spaced-apart terminal ends, said walls having formed therein at least one pair of apertures in spaced-apart, opposed relationship near each said post terminal end and a series of elongated ribs extending inward from said walls and along the lengths of said posts between said apertures;
   (b) a coupling for axially joining one said post to another in rigid, axial, end-to-end alignment comprising:
      (i) a butt plate for transverse positioning between said terminal ends of said joined posts;
      (ii) at least two stems extending outward from said butt plate for insertion a distance into each said hollow post end, each said stem including two pairs of closely-spaced webs arranged in spaced-apart configuration and defined by opposed marginal edges spanning between said opposed walls of said post and having formed between said closely-spaced webs a slot for sliding receipt therein of a pair of opposed ribs when said stems are inserted into said hollow post ends, a crossweb transversely intersecting said spaced-apart pairs of webs and an end plate arranged parallel to said butt plate and intersecting said terminal edges of said webs and said cross-web to rigidify said stem; and,
   (c) a pair of arms of terminal length, extending downward along said stems, exterior thereof, and arranged to slidingly engage the interior surface of said post walls, said arms having formed thereon outwardly disposed inward tabs for securely fitting into said apertures formed in said opposed post walls after said arms are biased and said stems are fully inserted in said terminal ends of said posts.

2. The plurality of members of claim 1 wherein said hollow posts are defined by two pairs of flat post walls joined together along their respective marginal edges to form square crosssectional hollow posts.

3. The plurality of members of claim 1 wherein said apertures are circular and said tabs are round and of a diameter to securely fit into said circular apertures during assembly thereof.

4. The plurality of members of claim 1 wherein said butt plate is defined by marginal edges that extend to the outer surfaces of said walls of said post.

5. The plurality of members of claim 1 wherein the distance between said arms adjacent their connection to said butt plate is equal to the distance between said interior wall surfaces in said posts and said arms extend outward from said butt plate and apart at an angle from each other, and including a web formed under each said arm and extending therealong to support said arms.

6. The plurality of members of claim 1 wherein said pairs of closely-spaced webs are arranged a distance apart sufficient for them to have their respective slots receive interior post wall ribs extending inward from opposite sides of said post walls to provide resistance to torsional deformation.

7. The plurality of members of claim 1 wherein said tabs are formed at the distal ends of said arms and including a knife edge formed on said tabs angling toward said webs to permit easier introduction of said tabs in said hollow ends of said posts.

8. The plurality of members of claim 7 wherein said tabs have formed thereon an additional beveled surface between said knife edge and said butt plate for ease in biasing said tabs out from said apertures when withdrawing said posts from said coupling.

9. The plurality of members of claim 1 further including an end cap comprising:
   (a) an end plate for transverse positioning over a terminal end of said post;
   (b) a stem extending outward from one side of said butt plate for insertion a distance into each said hollow post end, said stem including two pairs of closely-spaced webs arranged in spaced-apart configuration and defined by opposed marginal edges spanning between said opposed walls of said post and having formed between said closely-spaced webs a slot for sliding receipt therein of a pair of opposed ribs when said stem is inserted into said hollow post end, a cross-web transversely intersecting said spaced-apart pairs of webs and an end plate arranged parallel to said butt plate and intersecting said terminal edges of said webs and said cross-web to rigidify said stem;
   (c) a pair of arms of terminal length extending downward along said stems, exterior thereof, and arranged to slidingly engage the interior surface of said post walls, said arms having formed thereon outwardly disposed tabs for securely fitting into said apertures formed in said opposed post walls after said arms are biased inward and said stems are fully inserted in said terminal ends of said posts; and,
   (d) a knob extending outward from said end plate on the opposite side thereof from said stem for grasping for manipulating said plate.

10. The plurality of members of claim 9 wherein said knob is centrally located on said end plate.

11. The plurality of members of claim 1 wherein said butt plate is defined by marginal edges that extend to the outer surfaces of said walls of said post.

12. The plurality of members of claim 1 further including a branch coupling for axially joining one post to another in rigid axial, orthogonal alignment comprising:
   (a) a stub comprising a short length of rigid, hollow post defined by opposed pairs of flat post walls joined together along their respective marginal edges between spaced-apart terminal ends, said walls having formed therein at least one pair of apertures in spaced-apart, opposed relationship near each said post terminal end and a series of elongated ribs extending inward from said walls and along the lengths of said posts between said apertures;
   (b) at least two butt plates arranged in orthogonal relationship mounted exterior said walls of said stub for transverse positioning adjacent said terminal ends of said posts to be joined;
   (c) a stem extending outward from each said butt plate for insertion a distance into each said hollow post end, each said stem including two pairs of spaced-apart webs arranged in spaced-apart configuration and defined by opposed marginal edges spanning between said opposed walls of said stub and having formed between said closely-spaced webs a slot for sliding receipt therein of a pair of opposed ribs when said stems are inserted into said stub ends, a cross-web transversely intersecting said spaced-apart pairs of webs and an end plate arranged parallel to said butt plate and intersecting said terminal edges of said webs and said cross-web to rigidify said stem; and,
   (d) a pair of arms of terminal length extending downward along said stems, exterior thereof, and arranged to slidingly engage the interior surface of said stub walls, said arms having formed thereon outwardly disposed tabs for securely fitting into said apertures formed in said opposed post walls after said arms are biased inward and said stems are fully inserted in said terminal ends of said posts.

13. The plurality of members of claim 12 wherein said apertures are circular and said tabs are round and of a diameter to securely fit into said circular apertures during assembly thereof.

14. The plurality of members of claim 12 wherein said butt plate is defined by marginal edges that extend to the outer surfaces of said walls of said post.

15. The plurality of members of claim 12 wherein the distance between said arms adjacent their connection to said butt plate is equal to the distance between said interior wall surfaces in said posts and said arms extend outward from said butt plate and apart at an angle from each other, and including a web formed under each said arm and extending therealong to support said arms.

16. The plurality of members of claim 12 wherein said pairs of closely-spaced webs are arranged a distance apart sufficient for them to have their respective slots receive interior post wall ribs extending inward from opposite sides of said post walls to provide resistance to torsional deformation.

17. The plurality of members of claim 12 wherein said tabs are formed at the distal ends of said arms and including a knife edge formed on said tabs angling toward said webs to permit easier introduction of said tabs in said hollow ends of said posts.

18. The plurality of members of claim 1 further including a base plate comprising:
   (a) a planar rim base defined by marginal edges that form a perimeter for resting on a support surface;
   (b) a platform extending upward from said rim at an angle to enclose said perimeter;
   (c) said platform having formed therein a depression centrally thereof extending downward toward the plane of said base;
   (d) a stem extending upward from said depression including a pair of spaced-apart webs defined by opposed marginal edges for spanning between said opposed walls of said post and having formed therealong a slot for sliding receipt therein of a pair of opposed ribs, a cross-web transversely intersecting said spaced-apart webs to rigidify said stem; and,
   (e) a pair of arms extending upward said stems, exterior thereof, and arranged to slidingly engage the interior surface of said post walls, said arms terminating in outwardly disposed nubs for fitting into said aperture formed in said opposed post walls after said posts are set down over said stem.

19. The plurality of members of claim 18 wherein said platform forms a pair of narrow depressions adjacent said arms and extending outward therefrom toward said perimeter to allow one's fingers additional room to squeeze said tabs inward of said apertures when disassembling said members.

20. The plurality of members of claim 18 wherein said platform has formed therein a plurality of apertures through which elongated fasteners may be inserted to attach said platform to an underlying supporting surface.

* * * * *